G. R. LA RUE.
GREASE CUP FILLER.
APPLICATION FILED MAR. 8, 1910.
980,804.
Patented Jan. 3, 1911.
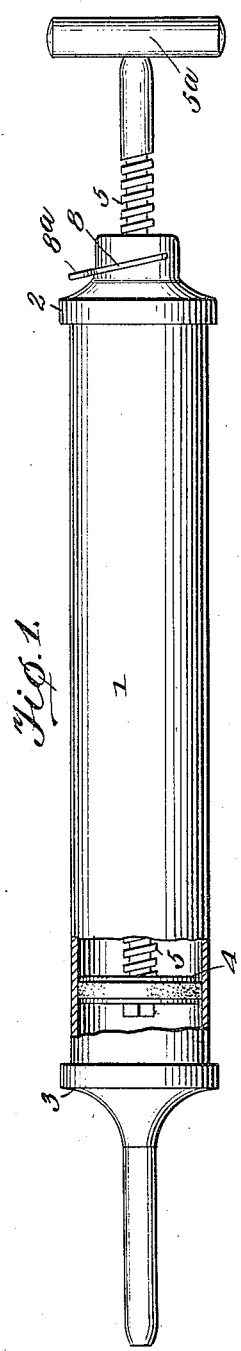
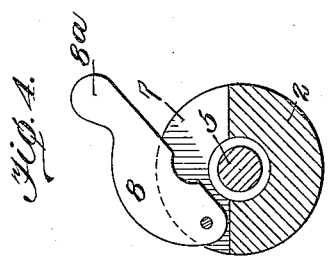
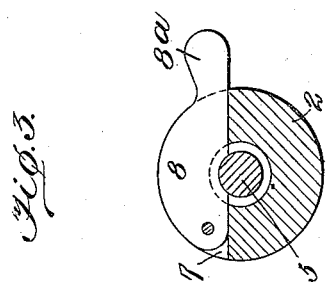
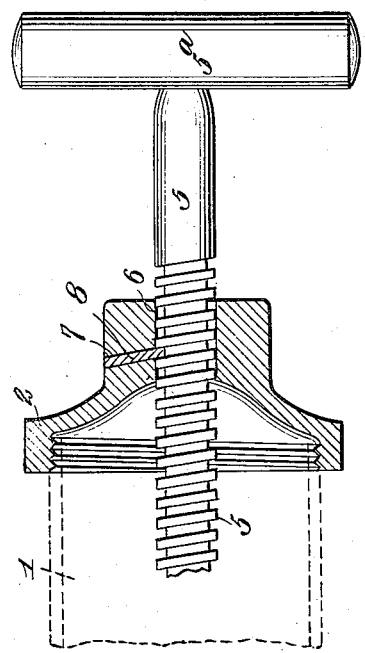
WITNESSES:
Samuel E. Wade
Amos W. Hart
INVENTOR
Guy R. LaRue
BY Munn & Co.
ATTORNEYS

UNITED STATES PATENT OFFICE.

GUY R. LA RUE, OF TELL CITY, INDIANA.

GREASE-CUP FILLER.

980,804.

Specification of Letters Patent.

Patented Jan. 3, 1911.

Application filed March 8, 1910. Serial No. 547,959.

*To all whom it may concern:*

Be it known that I, GUY R. LA RUE, a citizen of the United States, and a resident of Tell City, in the county of Perry and State of Indiana, have invented an Improved Grease-Cup Filler, of which the following is a specification.

My invention is an improved device for filling the grease or oil cups used on machinery, with lubricant in a semi-solid or liquid form.

It is more particularly an improvement in that class of so-called "grease-guns" in which the screw that operates the slidable piston is provided with a device adapted to engage the threads of the screw and thus serve temporarily as a nut.

The details of construction and operation of the device are as hereinafter described, and illustrated in the accompanying drawing, in which:—

Figure 1 is a side view of the grease-cup filler, a portion being broken away to show interior construction. Fig. 2 is a longitudinal, central section of the head portion of the device. Figs. 3 and 4 are cross-sectional views illustrating the construction, arrangement, and operation of the lock or latch.

The hollow body 1 of the device or implement is cylindrical in form and provided with a detachable head 2 and a nozzle 3, both being detachably applied by means of a screw-thread, as illustrated in Fig. 2. The piston 4 arranged in the body 1 is provided with packing so as to fit somewhat closely, and is detachably secured to a screw 5, which is adapted to slide in the opening 6 provided in the head 2. A handle $5^a$ is applied to the outer end of the screw, as shown.

The extended neck of the head 2 is provided with a transverse slot 7, which is inclined corresponding to the inclination of the threads of the screw 5 and in said slot a latch or locking device 8 is pivoted and whose inner edge is adapted to enter between adjacent threads of the screw, as shown in Figs. 2 and 3. The locking device 8 is a flat metal plate having sufficient thickness to give it the required rigidity and provided with a notch adapted, for contact with the body of the screw, and with an extended free end $8^a$, which serves as a handle or thumb-piece for convenience in manipulation.

In using the instrument, the nozzle 3 is detached and the latch 8 thrown up into the position indicated in Fig. 4, and the screw drawn out its full length, or until the piston 4 is in contact with, or at least adjacent to, the head 2. Then, grease in a semi-solid form may be introduced into the cylinder and the nozzle 3 is replaced. In case it is desired to fill the cylinder 1 with grease in a liquid form, it is of course unnecessary to remove the nozzle 3, but, upon inserting the tip of the nozzle in the liquid and drawing the piston back, the cylinder will be filled by suction. In order to fill a grease or oil cup, the nozzle is placed therein and pressure is applied to the handle $5^a$, to push the piston toward the nozzle 3; or the handle is rotated, in case the latch is turned down, as shown in Figs. 1, 2 and 3. In other words, it is apparent that the screw may be operated in two ways; it may be pushed through the head 2 when the latch 8 is raised, as in Fig. 4, or, when turned down and engaged with the screw, as in Fig. 3, the screw may be rotated, the piston being in either case forced toward the nozzle 3 so as to expel more or less the content of the cylinder. Either of these two methods of operating the screw and piston will be employed according to the nature of the lubricant and the amount which it is required to discharge from the nozzle.

To lock the screw 5 with the head 2 or to unlock it therefrom, it is obviously only necessary to seize the extension or thumb-piece $8^a$ of the latch 8 and push it down or up as required. The operation may be easily and instantly effected and the device 8 will retain by friction either position in which it may be placed.

I thus provide a device—commonly termed a "grease-gun"—which is adapted for convenient and effective use and which may be manipulated in either of two ways by the simple adjustment of a single locking device.

The head 2 with the latch 8 may be manufactured and sold as an attachment for ordinary grease-guns which are provided with a screw for operating the piston, but adapted for use only by rotation of the screw.

What I claim is:—

The improved grease-cup filler, comprising a hollow cylindrical body, a piston and screw attached thereto, the screw being provided exteriorly with a handle, a head having an extended neck provided with an opening through which the screw is adapted to slide and with a transverse slot, and inclined transversely correspondingly to the pitch of the screw, and a latch consisting of a flat plate pivoted in said slot and adapted to enter between the threads of the screw, its free end projecting from the slot, as shown and described.

GUY R. LA RUE.

Witnesses:
HENRY BACHMANN,
WILLIAM A. POEHLEIN.